(12) United States Patent
Nahm et al.

(10) Patent No.: US 8,332,630 B2
(45) Date of Patent: Dec. 11, 2012

(54) METHOD AND SYSTEM FOR ELECTRONIC DEVICE AUTHENTICATION

(75) Inventors: Kitae Nahm, Irvine, CA (US); Juan Carlos Trujillo, San Diego, CA (US); Shiang-feng Lee, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1162 days.

(21) Appl. No.: 12/124,103

(22) Filed: May 20, 2008

(65) Prior Publication Data

US 2009/0293096 A1    Nov. 26, 2009

(51) Int. Cl.
*H04L 29/06* (2006.01)
*G06F 7/04* (2006.01)

(52) U.S. Cl. ............. 713/156; 726/26; 726/30; 725/131

(58) Field of Classification Search ................... 713/156
See application file for complete search history.

(56) References Cited

U.S. PATENT DOCUMENTS

| | | | | |
|---|---|---|---|---|
| 5,623,601 A | * | 4/1997 | Vu | 726/12 |
| 2006/0008256 A1 | * | 1/2006 | Khedouri et al. | 386/124 |
| 2007/0005955 A1 | * | 1/2007 | Pyle et al. | 713/156 |
| 2007/0201699 A1 | * | 8/2007 | Kasuya | 380/258 |

OTHER PUBLICATIONS

"Exploiting X.509 Certificate and Multi-Agent System Architecture for Role-based Access Control and Authentication Management", Fugkeaw et al., IEEE, Oct. 16-19, 2007.*
Diffie, W. et al., "New Directions in Cryptography," IEEE Transactions on Information Theory, vol. IT-22, No. 6, Nov. 1976, pp. 29-40, United States.

* cited by examiner

*Primary Examiner* — Taghi Arani
*Assistant Examiner* — Mohammad L Rahman
(74) *Attorney, Agent, or Firm* — Beyer Law Group LLP

(57) ABSTRACT

A method and system for authentication an electronic device is provided. One implementation involves obtaining a set of authentication parameters; prioritizing the authentication parameters into: express-parameters defining one or more express check points, and post-parameters defining one or more post-check points; authenticating each express check point; upon successful authentication of each express check point, commencing authentication of the post-check points; wherein the electronic device is authenticated when all the express check points and post-check points are successfully authenticated.

22 Claims, 3 Drawing Sheets

List of the check points of X.509 Certificate

Prioritized check points of X.509 Certificate

METHOD AND SYSTEM FOR ELECTRONIC DEVICE AUTHENTICATION

FIELD OF THE INVENTION

The present invention relates generally to authentication and in particular to authentication of electronic devices.

BACKGROUND OF THE INVENTION

Operational parameters in consumer electronics devices, such as the current local time, are often unreliable because the ordinary user does not pay attention to the details of the product settings. Such inaccurate parameters can unexpectedly affect the authentication of the device if an authentication algorithm uses the unreliable parameters. An example of such is an OpenCable Application Platform television (OCAP TV) and a set-top-box (STB) for the cable network. OCAP is a CableLabs-specified middleware for digital televisions and digital cable set-tops.

To receive such a cable service, the OCAP host (i.e., TV or set-top-box) and a cable service provider must authenticate each other. The authentication procedure includes a valid period check for the certificates of the host and cable service using the current local time. However, when the local time of the host is inaccurate, the authentication fails. This is typically because the user has not provided the correct current local time to the host (e.g., by correctly programming the OCAP TV date and time settings). Recovery from false/failed authentication is typically complex and time consuming, which requires the user to call customer support at the cable provider, waiting for a reply, and finding and providing the serial number of the OCAP TV to the customer support, to authenticating the OCAP TV to the cable service provider.

Conventional certificate authentication is a very strict and inflexible procedure without allowing any partial completion of the intermediary steps, wherein all the required authentication parameters must be provided, and be correct.

BRIEF SUMMARY OF THE INVENTION

The present invention provides a method and system for authentication of electronic devices. One embodiment involves authenticating an electronic device, by obtaining a set of authentication parameters; prioritizing the authentication parameters into: express-parameters defining one or more express check points, and post-parameters defining one or more post-check points; authenticating each express check point; upon successful authentication of each express check point, commencing authentication of the post-check points; wherein the electronic device is authenticated when all the express check points and post-check points are successfully authenticated.

The express-parameters may include reliable parameters, and post-parameters may include unreliable ambiguous custom premise parameters. Authentication of each post-check point may further include examining a post-parameter for reliability; and if the examined post-parameter is reliable, then performing authentication of the post-check point.

These and other features, aspects and advantages of the present invention will become understood with reference to the following description, appended claims and accompanying figures.

DETAILED DESCRIPTION OF THE INVENTION

Figure 1:
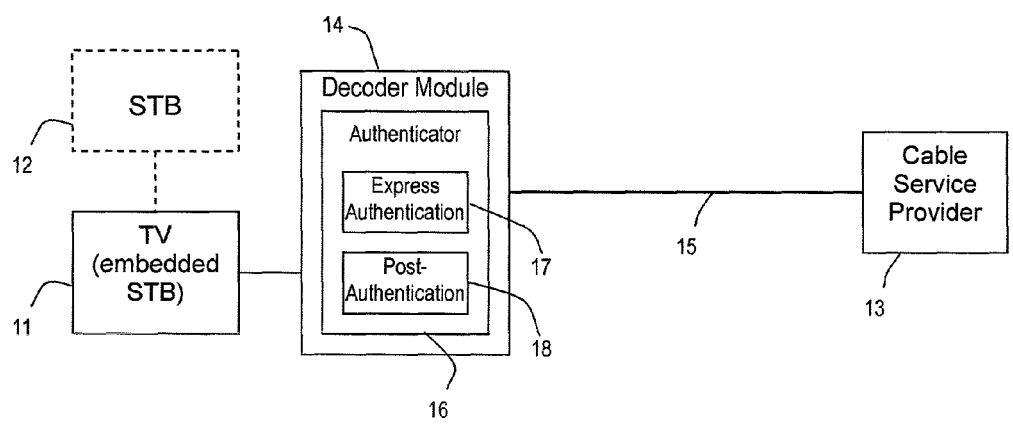
FIG. 1 shows a functional block diagram of a system implementing an authentication process, according to an embodiment of the present invention.

The present invention provides a method and system for authentication of electronic devices. One embodiment involves authentication of an electronic device based on unreliable authentication parameters, such as electronic device post-authentication using unreliable parameters. One embodiment involves prioritizing steps of an authentication process for successfully authenticating an electronic device, when parameters involved in high priority steps authenticate successfully, even if one or more parameters involved in low priority steps do not immediately authenticate successfully.

Preferably, the steps of authentication are itemized and prioritized as check points. First, all of the check points are itemized (listed) for the full authentication of an electronic device. Then, the itemized check points are divided into e.g., two groups (express check points and post-check points). Thereafter, a multi-stage authentication is performed based on the check points, involving express authentication and post-authentication.

The express check points include essential and non-negotiable parameters in terms of authentication, and must be free from ambiguity. The post-check points include parameters which may be allowed ambiguity and are examined only after the express parameters authenticate successfully, indicating a measure of confidence in the ambiguous (unreliable) post-check point parameters.

The post-authentication of the post-check points includes the ability to cancel the express authentication result if the device passed the express authentication but fails in the post-authentication. As such, post-authentication can cancel or confirm the prior express authentication.

An example implementation of an authentication process according to the invention for an OCAP device using Cable-CARD, is now described (CableCARD is a plug-in card which allows consumer electronics devices to decode and access digital cable television channels without a STB or a decoder from a cable television provider). The process involves authentication while reducing false authentication errors due to unreliable parameters without compromising security.

A check point can include any authentication procedure, such as key generation, digital signature extraction, and verification of specific security information. The authentication requires all of the check points be passed. Certain check points use the result of other check points. Certain check points may use static and reliable security information, but others may not. All of the check points needed for the full authentication are itemized. Then, the check points are grouped into priority groups including: express check points and post-check points.

The post-check points are those using ambiguous (unreliable) custom premise parameters, which are to be examined later when the accuracy of the post-check point parameters is confirmed. The express check points are those essential for immediate/express authentication, which do not belong to the post-check points.

FIG. 1 shows a functional block diagram of a system 10 implementing an embodiment of the invention. The system 10 includes an electronic device such as an OCAP TV 11 with an embedded STB, an optional standalone STB 12, and a decoder module 14. The decoder module 14 can be connected to a cable service provider 13 (e.g., OCAP service provider) via a link 15 for providing audio/visual programming to the decoder module 14. The decoder module 14 decodes encoded programming from the cable service provider (head end) 13 for display on the TV 11. The decoder module 14 may be an OCAP device.

In one example, the decoder module 14 comprises functionality of CableCARD and further comprises an authenticator 16 according to an embodiment of the invention. The authenticator 16 authenticates the TV 11 to the cable service provider 13, wherein upon successful authentication the decoder 14 proceeds to decode programming from the provider 13 for display on the TV 11. The provider 13 includes an authentication module which cooperates with the authenticator 16 for said authentication. In this example, the TV 11 and decoder module 14 form a client, and the provider 13 forms a server.

Further, in this example, the authenticator 16 includes an express authentication module 17 and a post-authentication module 18. The modules 17, 18 may be implemented in firmware, software, logic circuits, and the like. The express authentication module 17 implements an express authentication process according to the invention as described herein. The post-authentication module 18 performs a post-authentication process according to the invention as described herein. Although in this example the authentication process is described as being implemented in the decoder 14, in another example the authentication process may be implemented in the TV 11, or in the STB 12.

The itemization and prioritization process may be performed by the decoder module 14 or may be performed separately, and the resulting check points of the itemization and prioritization may be provided to the modules 17, 18, for performing authentication processes therefrom.

Figure 2:
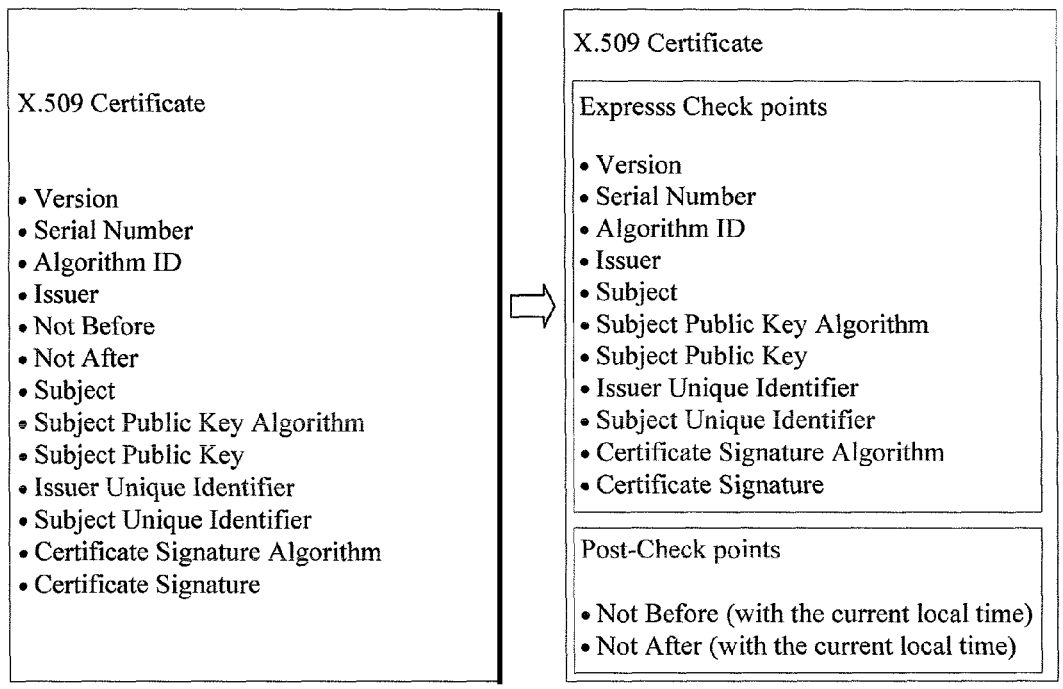
FIG. 2 shows an example of prioritized authentication parameters, according to an embodiment of the present invention.

FIG. 2 shows an example process 20 for the itemization and prioritization of the check points using an X.509 certificate verification. A list 21 includes check points (parameters) of the X.509 certificate to be verified (authenticated). A prioritized list 22 of check points for the X.509 certificate is created from the list 21, according to the invention. The prioritized list 22 includes a set of express check points to be authenticated by the express authentication module 17, and a set of post-check points for authentication by the post-authentication module 18.

In the prioritized check point list 22, parameters such as "serial number" and "issuer" parameter fields, for example, are extracted from a static encrypted source as parameters for the verification of other X.509 certificate. Since such parameters are confirmed without ambiguity (i.e., the parameters are preprogrammed in the TV 11 or the decoder 14 and remain reliable), they are placed into the express check points.

However, parameter fields such as "not before" and "not after" (time/date fields) which define the valid period of the X.509 certificate, are associated with the current local time set for the TV 11, are typical of custom premise parameters which can go wrong for many reasons, including the carelessness of the user. Such custom premise parameters are placed into the post-check points list. For example, the "not before" and "not after" fields are types of parameters, successful verification of which depends on a local time value of the TV 11 set by the user, and may typically be initially inaccurate or unreliable (e.g., entered wrong for many reasons, including carelessness of the user) when the TV 11 is first set up.

First, in an express authentication phase, the express check points are authenticated, and if all the express check points pass, then in a post-authentication phase one or more attempts are made to authenticate the post-check points. If a post-check point is determined to provide a reliable value (compared to an initial potentially unreliable value), then an authentication of the post-check point is attempted. However, if a post-check point is determined not to provide a reliable value, then the post-authentication phase may delay authentication and examines the post-check point again for a reliable value (e.g., perhaps user sets the current time during the delay), or the post-authentication phase may attempt to obtain a reliable value for the post-check point (e.g., ask the user to confirm a current time).

Figure 3:
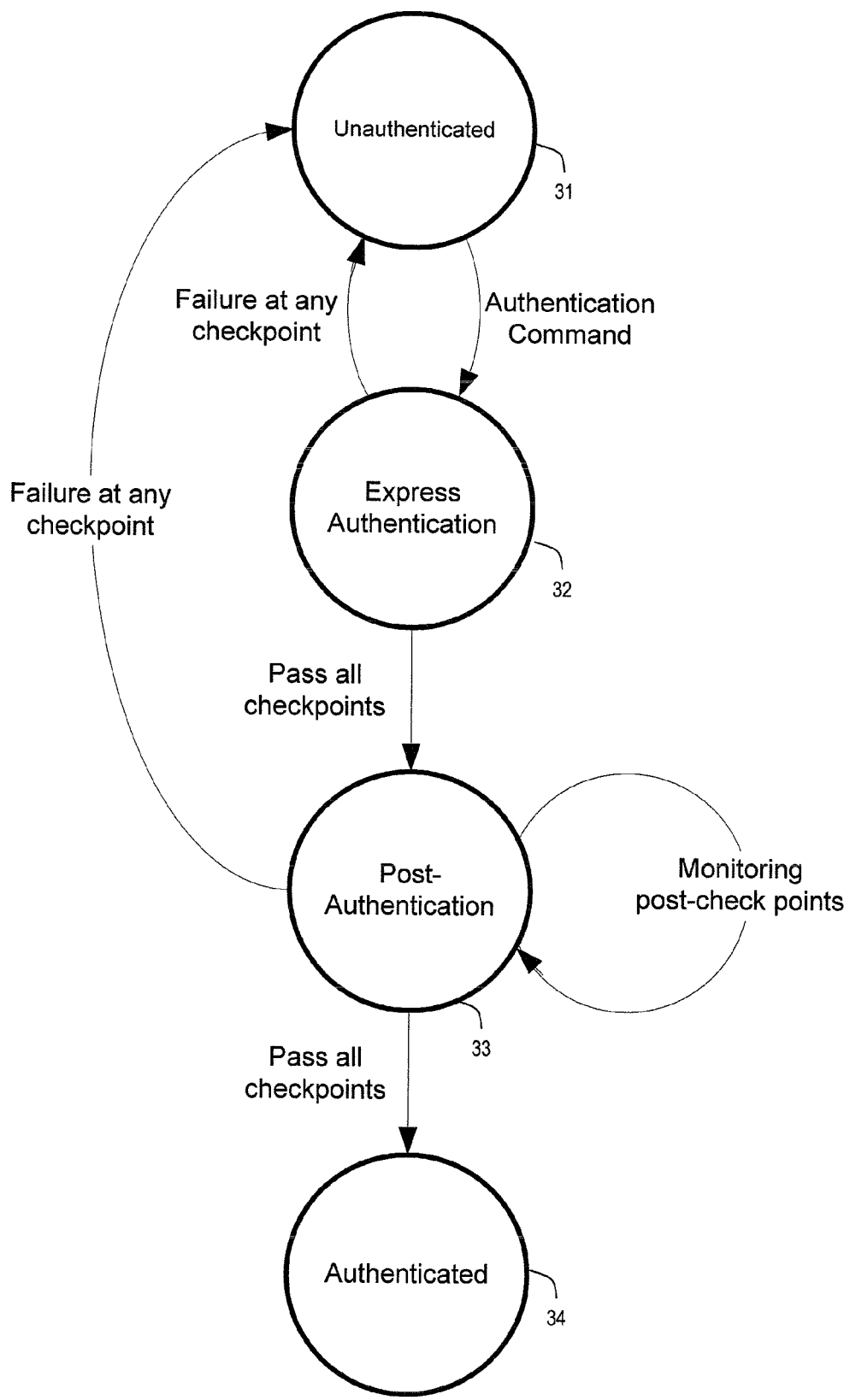
FIG. 3 shows an example process for authenticating an electronic device, according to an embodiment of the present invention.

FIG. 3 illustrates an authentication process 30 using a prioritized check point-list such as check-point list 22, wherein the authenticator 16 performs a multi-stage authentication (express authentication 17 and post-authentication 18). The multi-stage authentication is implemented as a state machine process, involving express authentication and post-authentication. The process begins in block 31, wherein the certificate is initially unauthenticated. Then an express authentication block 32 examines the express check points in the express check point list 22, one by one. If authentication of any of the express check points fails, the entire authentication process fails (certificate is unauthenticated/unverified).

If all of the express check points successfully pass authentication, then post-authentication block 33 is invoked. In the post-authentication process, the state of the custom premise parameters is monitored in the background and the corresponding post-check points are evaluated whenever the custom premise parameters are confirmed (e.g., user enters local time for the TV 11). The post-authentication block 33 attempts to authenticate each post-check point in the prioritized list 22. When all of the post-check points successfully pass authentication, the multi-stage authentication process 30 is completed and block 34 declares that TV 11 is authenticated.

An unsuccessful post-authentication result can cancel a successful express authentication result, if the TV 11 passed the express authentication check points, but failed authentication of any of the post-check points. For example, the post-authentication can reset all of the security keys created during express authentication if any post-check point fails later.

The authentication is not completed until all of the check points in the express and post-check points are examined and pass authentication. In one example, the process 30 remains in post-authentication phase for each post-check point up to a specified time period (threshold), and at the end of the period if the post-check point does not indicate a reliable value to authenticate, then the post-authentication for that post-check point terminates, to prevent abuse of the post-authentication. An implementation involves a timeout mechanism to limit the duration of the post-authentication. If a user does not provide the correct value of the time parameter by a pre-defined deadline, the authentication termination logic can trigger a timeout and cancel the express authentication result.

In another example, post-authentication terminates when the time mode is manual and the current local time on the device is questionable (unreliable), wherein the post-authentication logic can display the current local time stored in the device 11 and ask the user if the displayed current time is correct (if the user acknowledges, then the post-authentication attempts to authenticate based on that acknowledgement). Or, the post-authentication logic can run its own automated clock set function, and/or ask the user to turn the automatic time mode on. In the above examples, post-check points are a matter of authentication and post-parameters (or post-check parameters) are a matter of reliability.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements. Though the present invention has been described with reference to certain versions thereof; however, other versions are possible. Therefore, the spirit and scope of the appended claims should not be limited to the description of the preferred versions contained herein.

What is claimed is:

1. A method of authentication of an electronic device, comprising:
   obtaining a set of authentication parameters for an X.509 certificate from a memory on the electronic device;
   prioritizing the X.509 certificate authentication parameters into:
   express-parameters defining one or more express check points that include consistently reliable parameters from a static source, and post-parameters defining one or more post-check points that includes time/date fields that are unreliable, said prioritizing performed by a processor on the electronic device;
   authenticating each express check points;
   upon successful authentication of each express check point, determining whether a post-parameter is reliable; and
   if the post-parameter relating to time/date setting is reliable, authenticating the post-check point corresponding to the post-parameter, said authenticating performed by the processor on the device;
   wherein an authentication failure of the post-parameter is avoided, thereby preventing a re-setting of the entire authentication process of the device, including re-authentication of each express check points.

2. The method of claim 1, wherein the express-parameters include reliable parameters and post-parameters include unreliable ambiguous custom premise parameters.

3. The method of claim 2, wherein authentication of each post-check point further includes:
   examining a post-parameter for reliability; and
   if the examined post-parameter is reliable, then performing authentication of the post-check point.

4. The method of claim 3, wherein authentication of each post-check point further includes:
   if the examined post-parameter is unreliable, delaying authentication and periodically examining the post check point for reliability, then performing authentication once the post-parameter becomes reliable.

5. The method of claim 3, wherein authentication of each post-check point further includes:
   periodically examining the post-parameter for reliability, up to a threshold, and terminating the authentication if the post-parameter remains unreliable.

6. The method of claim 3, wherein authentication of each post-check point further includes:
   if the examined post-parameter is unreliable, obtaining a reliable value for the post-parameter to conduct authentication of the post-check point.

7. The method of claim 1, wherein the electronic device comprises an OpenCable Application Platform (OCAP) device.

8. The method of claim 7, wherein the electronic device comprises an OCAP device that is to be authenticated by an OCAP service provider.

9. The method of claim 8, wherein the electronic device comprises an OCAP device and the OCAP service provider comprises a cable service provider.

10. An apparatus for authentication of an electronic device, comprising:
    an authenticator configured for authenticating a set of authentication parameters for an X.509 certificate, the authentication parameters prioritized into: express-parameters defining one or more express check points that include consistently reliable parameters from a static source, and post-parameters defining one or more post-check points that includes time/date fields that are unreliable; and
    the authenticator including an express authentication module configured for authenticating each express check point, and a post-authentication module configured such that upon successful authentication of each express check point, the post-authentication module determines whether a post-parameter is reliable and, if the post-parameter is reliable, the post-parameter module authenticates the post-check point corresponding to the post-parameter;
    wherein an authentication failure of the post-parameter is avoided, thereby preventing a re-setting of the entire authentication process of the device, including re-authentication of each express check points.

11. The apparatus of claim 10, wherein the express-parameters include reliable parameters, and post-parameters include unreliable ambiguous custom premise parameters.

12. The apparatus of claim 11, wherein the post-authentication module is further configured for authenticating each post-check by:
    examining a post-parameter for reliability; and
    if the examined post-parameter is reliable, then performing authentication of the post-check point.

13. The apparatus of claim 12, wherein the post-authentication module is further configured for authenticating each post-check point by:
    if the examined post-parameter is unreliable, delaying authentication and periodically examining the post-parameter for reliability, then performing authentication once the post-parameter becomes reliable.

14. The apparatus of claim 12, wherein the post-authentication module is further configured for authentication of each post-check point by:
    periodically examining the post-parameter for reliability, up to a threshold, and terminating the authentication if the post-parameter remains unreliable.

15. The apparatus of claim 12, wherein the post-authentication module is further configured for authentication of each post-check point further by:
    If the examined post-parameter is unreliable, obtaining a reliable value for the post-parameter to conduct authentication of the post-check point.

16. The apparatus of claim 10, wherein the electronic device comprises an OpenCable Application Platform (OCAP) device.

17. The apparatus of claim 16, wherein the electronic device comprises an OCAP device that is to be authenticated by an OCAP service provider.

18. The apparatus of claim 17, wherein the electronic device comprises an OCAP device and the OCAP service provider comprises a cable service provider.

19. An authentication system, comprising:
a service provider having an authentication process;
an electronic device including an authenticator configured for authenticating a set of authentication parameters for an X.509 certificate in cooperation with the service provider, the authentication parameters prioritized into: express-parameters defining one or more post-check points that includes consistently reliable parameters from a static source, and post-parameters defining one or more post-check points that includes time/date fields that are unreliable; and
the authenticator including an express authentication module configured for authenticating each express check point, and a post-authentication module configured such that upon successful authentication of each express check point, the post-authentication module determines whether a post-parameter is reliable and, if the post-parameter is reliable, the post-parameter module authenticates the post-check point corresponding to the post-parameter;
wherein an authentication failure of the post-parameter is avoided, thereby preventing a re-setting of the entire authentication process of the device, including re-authentication of each express check points.

20. The system of claim 19, wherein the express-parameters include reliable parameters and post-parameters include unreliable ambiguous custom premise parameters.

21. The system of claim 20, wherein the post-authentication module is further configured for authenticating each post-check by:
examining a post-parameter for reliability; and
if the examined parameter is reliable, then performing authentication of the post-check point.

22. The system of claim 19, wherein the electronic device comprises an OpenCable Application Platform (OCAP) device.

* * * * *